Jan. 17, 1956  D. KRUCOFF  2,731,624
ELECTROMAGNETIC ROD-POSITION INDICATOR
Filed June 19, 1953  2 Sheets-Sheet 1

INVENTORS
Darwin Krucoff
BY
ATTORNEY

Jan. 17, 1956 D. KRUCOFF 2,731,624
ELECTROMAGNETIC ROD-POSITION INDICATOR
Filed June 19, 1953 2 Sheets-Sheet 2

INVENTORS
Darwin Krucoff
BY
ATTORNEY

United States Patent Office 2,731,624
Patented Jan. 17, 1956

2,731,624

ELECTROMAGNETIC ROD-POSITION INDICATOR

Darwin Krucoff, Chicago, Ill., assignor to the United States of America as represented by the United States Atomic Energy Commission Application June 19, 1953, Serial No. 362,800

4 Claims. (Cl. 340—196)

The present invention relates to devices for indicating the position of a movable member along its path.

Although there have been many devices in the past for indicating the position of a movable member, these devices have generally been unsuitable for applications requiring an indication of a movable element enclosed within a sealed housing where the indicating device can have neither mechanical nor electrical connections traversing the sealed housing. A movable member disposed within a pressure vessel is an example of an application of a position indicating device in which it is desirable to avoid either mechanical or electrical connections which traverse the pressure vessel, since such connections generally weaken the pressure seal afforded by the pressure vessel. It is an object of the present invention to provide a position indicating device which produces an indication of the position of a movable member within a housing and requires no mechanical or electrical connections extending through the housing.

It is also an object of this invention to provide an indicating device for a movable member within a housing in which all portions requiring electrical or mechanical connections are disposed exterior to the housing but do not encompass the housing. This construction facilitates removal of the portion of the indicating device exterior to the housing for maintenance and servicing functions.

Other objects and advantages of the present invention will be readily apparent to the man skilled in the art from a further reading of the present specification, and from the drawings, in which.

Figure 2:
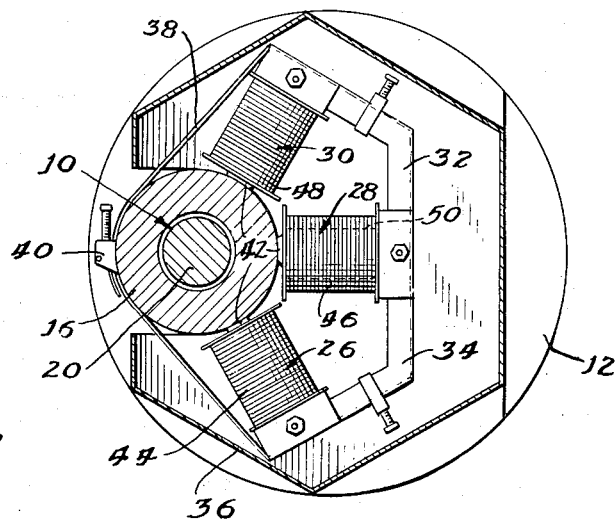
Figure 2 is a horizontal sectional view taken along line 2—2 of Figure 1.

As illustrated, the member 10 whose position is to be indicated is slidably disposed within a housing 12. The member 10 is in the form of an elongated rod, and is translatable within the housing 12 by a positioning means 14 also disposed within the housing 12. The housing 12 is provided with an outwardly extending sleeve-shaped portion 16 which opens to the exterior at one end, and the translatable member 10 traverses the sleeve portion 16 and extends to the exterior of the housing 12 therethrough.

The member 10 is provided with three portions 20, 22, and 24. The portion 20 is in the form of an insert in the member 10 and is disposed between the two other portions 22 and 24. The portion 20 and the housing 12 are constructed of materials having magnetic permeabilities of the order of magnitude of that of air, and the portions 22 and 24 have magnetic permeabilities at least ten times that of air.

In order to practice the invention, it is not necessary for the member 10 to extend through the sleeve portion 16 to the exterior of the housing 12, since the member 10 may be entirely confined within the housing 12. In such a construction, it is clear that the housing 12 may be pressurized. It is also clear that the sleeve portion 16 of the housing 12 may be sealed into a pressure vessel and thereby become a part of a pressurized device.

Surrounding the sleeve portion 16 of the housing are three electromagnets 26, 28, and 30 disposed on a plane normal to the axis of elongation of the member 10 and angularly displaced relative to each other. Two of the electromagnets 28 and 30 are magnetically coupled by a strap 32 of magnetic material which also supports them, and the other two electromagnets 26 and 28 are mechanically supported by a strap 34 of nonmagnetic material, such as brass. A magnetic shield 36 of magnetic material is disposed about the three electromagnets 26, 28 and 30, and is mounted on the housing 12. The three electromagnets 26, 28 and 30 are maintained with their magnetic poles disposed upon radii of the translatable member 10 and in contact with the sleeve portion 16 of the housing 12 by means of a nonmagnetic mounting strap 38 which is provided with a clasp 40 which encompasses the magnets and the sleeve portion 16 of the housing 12.

Figure 3:
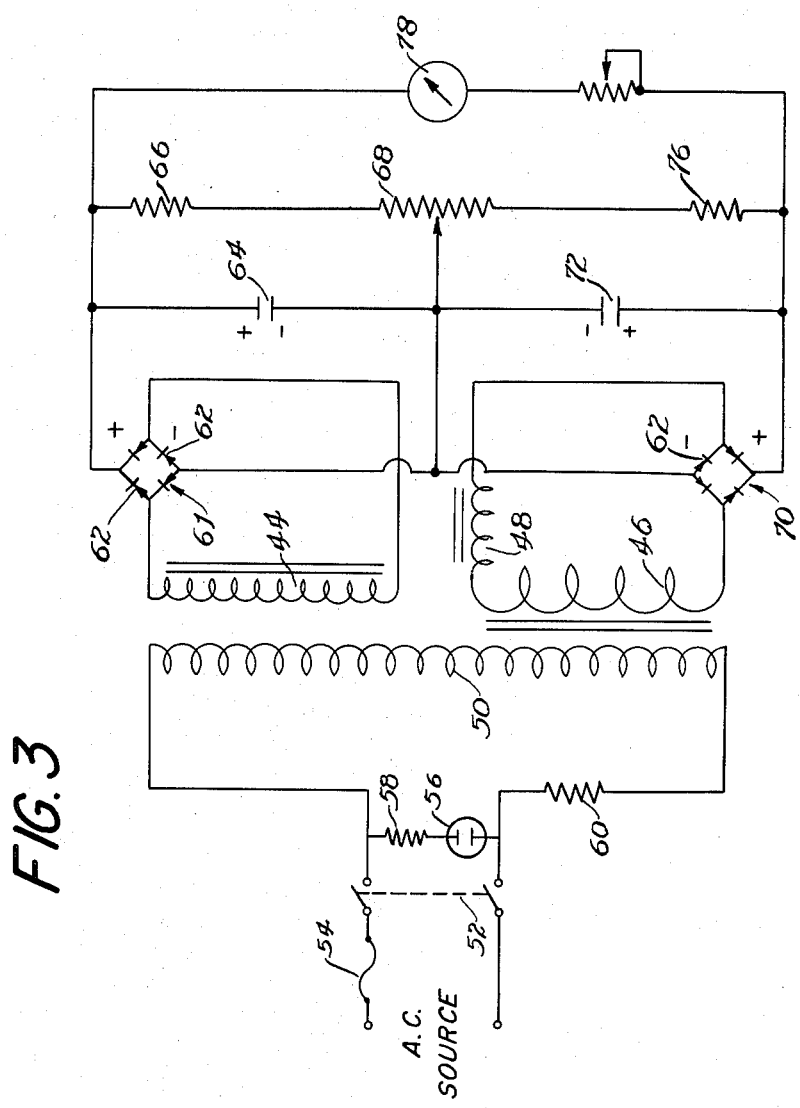
Figure 3 is a schematic electrical diagram illustrating the electrical circuit of the position indicator shown in Figures 1 and 2.

All three of the electromagnets 26, 28 and 30 are provided with magnetic cores 42 and have windings 44, 46, and 48, respectively. Figure 2 shows the position of the three electromagnets and their windings, and Figure 3 shows the circuit connections for the windings. The electromagnet 28 is also provided with a primary winding 50 which is wound beneath the secondary winding 46 on a common magnetic core 42. Thus, the windings 46 and 50 are coupled by a magnetic core, but the windings 44 and 48 are not provided with a magnetic coupling core to the primary winding 50. However, the winding 48 is coupled by the magnetic strap 32 to the primary winding 50 in the electromagnet 28. The electromagnet 26 is not provided with a low reluctance path to the primary winding 50.

Figure 1:
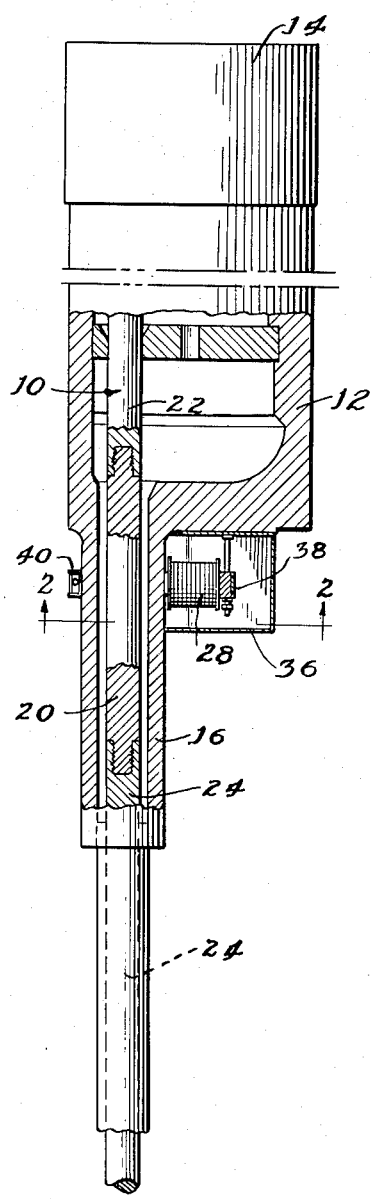
Figure 1 is a vertical sectional view (partially in elevation) of a position indicator illustrating the present invention.

The low permeability portion 20 of the translatable member 10 is positioned in the translatable member 10 to be in the portion of the sleeve portion 16 of the housing 12 adjacent to the electromagnets 26, 28 and 30. A magnetic field is set up by the primary winding 50 in the electromagnet 28 which may be considered to have four separate paths. As shown in Figure 2, the one path extends through the sleeve portion 16 of the housing 12 into the member 10, back through the sleeve portion 16, through the electromagnet 30, and through the strap 32 of magnetic material back to the electromagnet 28. Considering the same figure, a second path extends from the electromagnet 28, through the sleeve portion 16 of the housing 12 into the translatable member 10, back through the sleeve portion 16 of the housing 12, through the electromagnet 26, and thence back to the electromagnet 28 through a high reluctance path, since the nonmagnetic strap 34 provides a high reluctance path. As observed from Figure 1, the third path may be considered to extend from the electromagnet 28 through the sleeve portion 16 of the housing 12 along the sleeve portion 16 and into the portion 22 of the member 10 adjacent to the nonmagnetic portion 20 of the member 10, and thence back to the electromagnet 28 through a high reluctance air path. The fourth path may be considered to extend from the electromagnet 28 along the sleeve portion 16 of the housing 12, into the portion 24 of the translatable member 10 and back to the electromagnet 28 through a high reluctance air path. Because the portions 22 and 24 of the member 10 are of higher permeabilities than the housing and the portion 20, positioning of the member will vary the relative magnitudes of the flux linking winding 50 with windings 44 and 46. When either portion 22 or 24 of the member 10 is disposed adjacent to the electromagnets 26, 28 and 30, the flux through magnet 26 is reduced due to the magnetic shunting effect of the low reluctance portion 22 or 24. Although electromagnets 26 and 28 may be positioned at any angle relative to each other, including 180 degrees, best results are obtained when these electromagnets are positioned at an angle no greater than 90 degrees relative to each other. The circuit shown in Figure 3 measures the changes in the relative magnitudes of the magnetic flux linking winding 50 with windings 44 and 46.

The primary winding 50 of the electromagnet 28 is connected to a source of alternating current through a switch 52 and a fuse 54. A pilot lamp 56 is connected across the winding 50 through a resistor 58. A voltage dropping resistor 60 is also connected in series with the winding 50 to reduce the magnitude of the current flowing therethrough. A bridge rectifier 61 comprising four rectifying cells 62 is connected across the winding 44 of electromagnet 26, and the output of the bridge rectifier is developed across a condenser 64 which is in parallel with resistor 66 and a portion of potentiometer 68. In like manner the series connected outputs from windings 46 and 48 of electromagnets 28 and 30, respectively, are rectified by a bridge rectifier 70 using rectifying cells 62, and the direct voltage is developed across condenser 72 in parallel with resistor 76 and a portion of the potentiometer 68. Condensers 64 and 72 are connected in series opposition, and the difference in the potentials developed across the condensers is measured by a galvanometer 78 connected across the two condensers. The galvanometer 78 thus gives an indication of the relative magnitudes of the magnetic paths traversing the electromagnets 26 and 28.

The winding 48 of electromagnet 30 is, as stated above, connected in series with the windings 46 of electromagnet 28. The function of the electromagnet 30 is to compensate for changes in the relative currents flowing through coils 44 and 46 which result from changes in the temperature of the device, the electromagnet 30 being unnecessary for devices to be operated at a relatively constant temperature. Hence, the winding 48 is bifilar wound so that electromagnet 30 acts as a temperature compensating resistor. In order to produce temperature compensation, the combined resistance of windings 46 and 48 should equal the resistance of winding 44. The resistor 60 connected in series with the primary winding 50 minimizes changes in the current through the primary resulting from variations in temperature. Also, the use of a single primary winding 50 for the secondary windings 44 and 46 minimizes the changes in the position indications which would result from changes in the power supply voltage.

In one particular construction of the present invention, the housing 12 is constructed of AISI type No. 347 stainless steel, the portions 22 and 24 are constructed of AISI type No. 410 stainless steel, as defined by the American Society of Metals "Metals Handbook," 1948 edition, and the portion 20 is constructed of an alloy containing approximately 40 percent cobalt, 10 percent nickel, 3 percent iron, 20 percent chromium, not more than 1 percent molybdenum, 15 percent tungsten, 0.09 percent carbon, and 12 percent other elements, known as Haynes Alloy No. 25. The sleeve portion 16 of the housing has walls approximately ¾ inch thick and the member 10 is approximately 1 inch in diameter. The length of the nonmagnetic portion 20 of the translatable member 10 is approximately 8 inches long, with portion 22 being approximately 17 inches long and the portion 24 approximately 70 inches long.

A sixty-cycle alternating current 110 volts power source is used to supply current to the primary winding 50 which comprises 1,040 turns of No. 30 wire wound around a rectangular silicon iron core approximately one-half inch square and one and one-half inches long. Winding 44 has 3,110 turns, winding 46 has 61 turns and winding 48 has 3,050 turns of No. 40 wire. One-eighth inch Armco iron (as defined by "Metal Handbook" supra) sheet is used for the housing 36 surrounding the electromagnets.

Resistor 60 is approximately 500 ohms, condensers 64 and 72 approximately 10 microfarads, resistors 66 and 76 approximately 6,200 ohms, and potentiometer 68 approximately 2,000 ohms. The galvanometer 78 is a 0 to 50 microampere galvanometer having an internal resistance of about 2,000 ohms.

The man skilled in the art will readily devise many alternative devices within the scope of the present invention. For example, the translatable member 10 may be constructed with merely two portions rather than three portions, as illustrated. For these reasons, it is intended that the scope of the present invention be not limited by the specific embodiment herein set forth, but rather only by the appended claims.

What is claimed is:

1. Means to indicate the position of a movable device comprising, in combination, a housing having a magnetic permeability of the order of magnitude of that of air and provided with an elongated channel therein, an elongated member slidably disposed within the channel, said member having a portion constructed of material having a magnetic permeability at least ten times that of the housing, and a second portion adjacent thereto constructed of material having a magnetic permeability approximately equal to that of the housing, a pair of electromagnets mounted on the exterior of the housing adjacent to the portion of the member constructed of material having magnetic permeability approximately equal to that of the housing, said electromagnets being angularly positioned relative to each other on a plane normal to the axis of elongation of the member within the housing, one of said electromagnets having a pair of windings, one of said windings being electrically connected to a source of electrical power, and means to measure the relative magnitudes of the electrical currents flowing through the other winding of said electromagnet and the winding of the other electromagnet.

2. Means to indicate the position of a movable device comprising, in combination, a housing having a magnetic permeability of the order of magnitude of that of air and provided with an elongated channel therein, an elongated member slidably disposed within the channel, said member having a portion constructed of material having a magnetic permeability approximately equal to the housing and adjacent portions constructed of material having magnetic permeabilities at least ten times greater than that of the housing, three electromagnets mounted to the exterior of the housing adjacent to the portion of the member constructed of materials having magnetic permeabilities approximately equal to that of the housing, said electromagnets being angularly positioned relative to each other on a plane normal to the axis of elongation of the member, one of said electromagnets having two windings, one of said windings being electrically connected to a source of electrical power, and the other of said windings being connected in series with one of the other electromagnets, and means to measure the relative magnitudes of the electrical currents flowing through the series connected windings and the winding of the third electromagnet.

3. Means to indicate the position of a movable device comprising, in combination, a housing having a magnetic permeability approximately equal to that of air provided with an elongated cylindrical channel therein, a rod slidably disposed within the channel, said rod having a portion constructed of material having a magnetic permeability approximately equal to that of the housing and adjacent portions constructed of material having magnetic permeabilities at least ten times that of the housing, three electromagnets mounted to the exterior of the housing adjacent to the portion of the member constructed of material having magnetic permeability approximately equal to that of the housing, said electromagnets being disposed at approximately 60° angles relative to each other on a plane normal to the rod, the first electromagnet having two electrical windings, one of said windings being electrically connected to a source of electrical power, and the other of said windings being connected in series with the winding of a second electromagnet, a yoke constructed of magnetic material disposed between said second electromagnet and the first electromagnet, and means to measure the relative magnitudes of the electrical currents flowing through the series connected windings of the first electromagnet and second electromagnet and the current flowing through the winding of the third electromagnet.

4. Means to indicate the position of a movable device comprising, in combination, a housing having a magnetic permeability of the order of magnitude of that of air, a member slidably disposed within the housing, said member being mechanically coupled to the device whose position is to be indicated and provided with two adjacent portions, the one portion being constructed of material having a magnetic permeability of the order of magnitude of that of air and the other portion being constructed of material having a magnetic permeability at least ten times that of the other portion, a pair of magnetically permeable cores abutting the housing and angularly positioned relative to each other on a plane normal to the axis of elongation of the member within the housing, a non-magnetic strap disposed between the other ends of the magnetic cores, means to establish a magnetic field through one of the cores, and means to measure the relative magnitude of the magnetic field through the two cores.

References Cited in the file of this patent

UNITED STATES PATENTS

| | | |
|---|---|---|
| 2,417,097 | Warshaw | Mar. 11, 1947 |
| 2,430,757 | Conrad et al. | Nov. 11, 1947 |
| 2,570,672 | Hathaway | Oct. 9, 1951 |